United States Patent Office 3,151,089
Patented Sept. 29, 1964

3,151,089
COMPOSITION COMPRISING N-SUBSTITUTED AMIDE AND CELLULOSE ESTER
Alfred L. Miller, Dover, Del., assignor to Celanese Corporation of America, New York, N.Y., a corporation of Delaware
No Drawing. Original application May 27, 1950, Ser. No. 164,855, now Patent No. 2,970,789, dated Apr. 30, 1957. Divided and this application Dec. 10, 1953, Ser. No. 397,479
13 Claims. (Cl. 260—17)

This invention relates to polymeric compounds and relates, more particularly, to certain novel high molecular weight polymers which are obtained as a product of the polymerization of certain N-substituted unsaturated acid amides, or their derivatives, such as N-substituted acrylic acid amides, N-substituted methacrylic acid amides, N-substituted crotonic acid amides and N-substituted cinnamic acid amides, which compounds are referred to for the purpose of this invention as polyvinamides.

An object of this invention is the production of novel high molecular weight polymeric compounds adapted to be employed for the production of yarns, filaments, films, foils or molded articles when said polymeric compounds are subjected to suitable shaping operations.

Another object of this invention is the production of polymeric compounds which are soluble in those organic solvents which are also solvents for cellulose acetate, or other organic acid esters of cellulose, and which are compatible with said cellulose acetate or other organic acid esters of cellulose and capable of yielding films, foils, filaments and the like from solutions of mixtures of the two.

A further object of this invention is the provision of novel copolymers comprising the copolymerization reaction product of N-substituted acrylic acid amides, N-substituted methacrylic acid amides, N-substituted crotonic acid amides and N-substituted cinnamic acid amides with compounds copolymerizable therewith.

Other objects of this invention will appear from the following detailed description.

This application is a division of application S.N. 164,855, filed May 27, 1950, now U.S. Patent 2,790,789.

Polymers which are formed by the polymerization of compounds containing both substituted and unsubstituted vinyl groups are well known. Of the many polymers which fall within this class, perhaps the best known are those polymers which are obtained by polymerizing compounds such as vinyl acetate, styrene, acrylonitrile or the esters of acrylic acid, methacrylic acid, crotonic acid or cinnamic acid. While these polymers are suitable for many purposes, such as the production of extruded sheets and monofilaments, they are not especially well suited for the production of fine-denier, multi-filament yarns, for example. Although polymers of this type may be formed quite readily into filaments by melt spinning operations, the filamentary materials thus obtained possess too low a melting point for use in the production of fabrics for ordinary textile uses where ironing or pressing operations are commonly employed. This is due to the fact that their relatively low melting point renders them prone to glazing. Other polymers of this class such as polyacrylonitrile and polyvinylcarbazone are not adapted for melt spinning operations at all since they decompose when heated to temperatures of about 300° C. and do not melt at all. Polymers having many of the desirable properties of the vinyl polymers but melting in an intermediate range sufficiently low to permit melt spinning operations, yet high enough to enable the yarns and filaments to be employed for textile uses where ironing and pressing operations are employed would, obviously, be of great value.

I have now found that stable, high molecular weight polymers having melting points above 200° C. and capable of utilization by melt spinning operations may be obtained by polymerizing N-substituted amides of the following structure

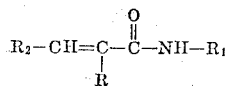

wherein R is a hydrogen or a methyl group and $R_1$ is a hydrocarbon group connected to the nitrogen atom by a tertiary carbon atom or a cycloalkyl group connected to the nitrogen atom by a secondary carbon atom, and $R_2$ is a hydrogen, an alkyl group such as a methyl group or an aryl group such as a phenyl group. I preferably employ as the hydrocarbon substituent $R_1$ groups which exhibit a high degree of molecular symmetry.

As examples of compounds which may be polymerized to yield said polyvinamide polymers are N-tertiary butyl acrylamide, N-tertiary butyl methacrylamide, N-tertiary amyl acrylamide, N-tertiary amyl methacrylamide, N-(dimethyl-phenyl-carbinyl) acrylamide, N-(dimethyl-phenyl-carbinyl) methacrylamide, N-cyclohexyl acrylamide, N-cyclohexyl methacrylamide, N-cyclopentyl acrylamide, N-cyclopentyl methacrylamide, N-tertiary butyl crotonamide, N-tertiary butyl cinnamamide, N-tertiary amyl crotonamide, N-tertiary amyl cinnamamide, N-cyclohexyl crotonamide, N-cyclopentyl crotonamide, N-cyclohexyl cinnamamide and N-cyclopentyl cinnamamide.

The polymerization of said monomeric N-substituted amides is preferably effected by suspending the monomer in about 8 to 10 parts by weight thereof of a dilute aqueous solution of a surface active or wetting agent, adding a polymerization catalyst to the aqueous suspension and emulsifying the resulting mixture by agitating the same in an inert atmosphere, such as nitrogen, until polymerization is completed. The emulsion polymerization is preferably effected at a temperature of 30 to 60° C. and the polymerization is usually completed after agitation for from about 3 to 20 hours. The emulsified polymers may be precipitated by pouring the emulsion or partly broken emulsion which is obtained into methanol with stirring. The precipitated polymer is then washed several times with hot water and then dried. The polymers precipitate in powder form and drying the powdered polymer under vacuum at about 100° C. for 4 to 6 hours is satisfactory to render the same suitable for use. Polymerization may also be effected without employing an emulsifying agent by carrying out the polymerization in water and with the aid of a polymerization catalyst. The polymeric compounds thus obtained may be subjected to melt spinning operations and, under suitable conditions, yield filaments of excellent physical characteristics. In lieu of melt-spinning as a means of forming yarns and filaments, both dry spinning or wet spinning methods may also be employed. Employing acetone as a solvent for the polyvinamide, the solution or dope thus formed may be dry spun into an evaporative atmosphere or may be extruded into water or other non-solvent for the polymer whereby wet-spun filaments may be obtained. Other solvents such as methanol, acetic acid, methylal, isopropyl alcohol, dioxane and methylene chloride may also be employed depending upon the solubility characteristics of the particular polymer.

Copolymers of said N-substituted amides with other polymerizable compounds such as acrylonitrile, styrene, vinyl chloride, vinyl acetate, butadiene, isoprene, methyl vinyl ketone, vinyl carbazol or vinyl pyridine, for example may be readily obtained by suitable copolymerization procedures. The copolymers may be obtained employing an emulsion polymerization procedure similar to that described above, for example, wherein an aqueous suspension containing the desired amount of each of the monomers is formed and, after the addition of a suitable polymerization catalyst, the reaction mixture is emulsified with agitation. Mass or bulk polymerization without solvents, or with solvents, i.e. solution polymerization in the melt or emulsion polymerization in solvents may also be effected. The copolymers formed may contain varying amounts of the monomeric N-substituted amides depending upon the properties desired in the copolymer.

Certain of the novel polyvinamide polymers of my invention which are obtained by polymerizing said N-substituted amides are soluble in acetone. Examples of said acetone-soluble polyvinamide polymers are polymerized N-tertiary butyl acrylamide, N-tertiary butyl methacrylamide and the copolymer obtained by copolymerizing 65 parts by weight of N-tertiary butyl acrylamide with 35 parts by weight of acrylonitrile. Since acetone is also a solvent for cellulose acetate and other organic acid esters of cellulose, films, foils, etc. of mixed materials may be obtained. Thus, by forming a solution of both a polyvinamide and cellulose acetate or other acetone-soluble organic acid ester of cellulose, and subjecting the resulting solution to a shaping operation, mixed yarns, filaments, films, foils and the like may be readily obtained containing both a cellulose derivative and polyvinamide. Also, thermoplastic molding materials may be obtained by forming a solution of the polyvinamide and cellulose derivative in a solvent or mixture of solvents for said thermoplastic materials, forming sheets or films of the mixed material by casting the solution, evaporating the solvent therefrom and then dividing the sheet material into particles of the desired size.

Thermoplastic molding materials may also be obtained by forming a plastic mass comprising a polyvinamide and a cellulose derivative with the aid of solvents and/or plasticizers, mixing the plastic mass on hot rolls, sheeting the material and then reducing the sheets to particle form. The molding powder which is obtained in this way may be employed in either compression or injection molding operation.

In order further to illustrate my invention, but without being limited thereto, the following examples are given:

*Example I*

10 parts by weight of N-tertiary butyl acrylamide are suspended in about 100 parts by weight of a 1% aqueous solution of the dioctyl ester of sodium sulfosuccinic acid and then 0.2 part by weight of potassium persulfate, a polymerization catalyst, is added thereto. The vessel containing the reaction mixture is flushed with nitrogen, sealed and placed in a constant temperature bath maintained at 45° C. The reaction mixture is agitated in the bath to emulsify the same and the agitation is continued for 18 hours. The polymer formed is precipitated from the emulsion by pouring the latter into methanol with stirring. The precipitated polymer is then washed three times with hot water, employing strong agitation during each washing. The finely divided polymer particles are finally dried under vacuum at 100° C. to remove any traces of the wash liquid. The polymer obtained has a melting point of about 200–210° C., is soluble in acetone and may be either melt spun into filaments of excellent characteristics or else wet or dry spun employing a suitable solvent or coagulant.

*Example II*

6.5 parts by weight of N-tertiary butyl acrylamide and 3.5 parts by weight of acrylonitrile are suspended in about 100 parts by weight of a 1% by weight aqueous solution of the dioctyl ester of sulfosuccinic acid containing 5 parts by weight of carbon tetrachloride and then 0.2 part by weight of potassium persulfate are added. The reaction mixture formed is placed in a reaction vessel in an atmosphere of nitrogen, and the mixture emulsified and polymerized by agitating the vessel for 18 hours at a temperature of 45° C. The polymer formed is precipitated by pouring the emulsion into methanol. After washing the precipitated polymer with hot water, it is dried at 100° C. under vacuum for four hours. The polymer obtained is soluble in acetone, has a melting point of 245–265° C. and is capable of being melt spun into satisfactory filaments.

*Example III*

A mixture of 200 parts by weight of N-tertiary butyl acrylamide, 2000 parts by weight of water and 4 parts by weight of potassium persulfate are placed in a suitable reactor under a nitrogen atmosphere and stirred for 16 hours at a temperature of 65° C. The reaction mixture thus obtained is filtered, the polymer washed with water and then dried. The polymerized N-tertiary butyl acrylamide obtained has a melting point of 200–210° C.

*Example IV*

10 parts by weight of N-cyclohexyl acrylamide, 5 parts by weight of carbon tetrachloride and 0.2 part by weight of potassium persulfate are added to 50 parts by weight of a 0.1% aqueous solution of the dioctyl ester of sodium sulfosuccinic acid and the mixture heated with stirring for 16 hours at a temperature of 65° C. The polymer formed is separated and washed with water. The polymerized N-cyclohexyl acrylamide obtained has a melting point of 210–220° C.

*Example V*

10 parts by weight of N-cyclohexyl methacrylamide, 5 parts by weight of carbon tetrachloride and 0.2 part by weight of potassium persulfate are added to 50 parts by weight of a 0.1% aqueous solution of the dioctyl ester of sodium sulfosuccinic acid and the mixture heated with stirring for 16 hours at a temperature of 65° C. The polymer formed is separated and washed with water. The polymerized N-cyclohexyl methacrylamide obtained has a melting point of 235–243° C.

*Example VI*

10 parts by weight of N-tertiary butyl methacrylamide, 5 parts by weight of carbon tetrachloride and 0.2 part by weight of potassium persulfate are added to 50 parts by weight of a 0.1% aqueous solution of the dioctyl ester of sodium sulfosuccinic acid and the mixture heated with stirring for 16 hours at a temperature of 65° C. The polymer formed is separated and washed with water. The polymerized N-tertiary butyl methacrylamide obtained has a melting point of 220–250° C.

*Example VII*

80 parts by weight of cellulose acetate (54.5% acetyl value, calculated as acetic acid) and 20 parts by weight of polymeric N-tertiary butyl acrylamide are dissolved in 400 parts by weight of acetone containing 5% by weight of water and the dope thus formed is dry spun into a 13 filament, 93 denier yarn. When the yarn obtained is tested for serimetric properties, it is found to have an elongation of 21% and a tenacity of 1.4 grams per denier. The yarn is readily dyed with the usual cellulose acetate dyestuffs.

It is to be understood that the foregoing detailed description is given merely by way of illustration and that many variations may be made therein without departing from the spirit of my invention.

Having described my invention, what I desire to secure by Letters Patent is:

1. A composition comprising a uniform mixture of a polymerized N-substituted compound of the formula $$R_2-CH=C-\underset{\underset{R}{|}}{\overset{\overset{O}{\|}}{C}}-NH-R_1$$

where R is selected from the class consisting of hydrogen and a methyl group, $R_1$ is a hydrocarbon group connected to the nitrogen atom through a member of the class consisting of a tertiary carbon atom and a secondary carbon atom of a cycloalkyl group and $R_2$ is selected from the class consisting of hydrogen, an alkyl group and an aryl group, and an acetone-soluble organic acid ester of cellulose.

2. A composition comprising a uniform mixture of a polymerized N-substituted compound of the formula

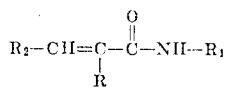

where R is selected from the class consisting of hydrogen and methyl group, $R_1$ is a hydrocarbon group connected to the nitrogen atom through a member of the class consisting of a tertiary carbon atom and a secondary carbon atom of a cycloalkyl group and $R_2$ is selected from the class consisting of hydrogen, an alkyl group and an aryl group, and an acetone-soluble organic acid ester of cellulose dissolved in a common solvent.

3. A composition comprising a uniform mixture of a polymerized N-substituted compound of the formula

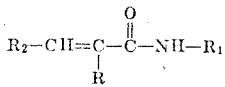

where R is selected from the class consisting of hydrogen and a methyl group, $R_1$ is a hydrocarbon group connected to the nitrogen atom through a member of the class consisting of a tertiary carbon atom and a secondary carbon atom of a cycloalkyl group and $R_2$ is selected from the class consisting of hydrogen, an alkyl group and an aryl group, and cellulose acetate.

4. A composition comprising a uniform mixture of a polymerized N-substituted compound of the formula

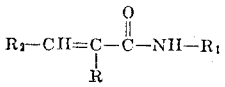

where R is selected from the class consisting of hydrogen and a methyl group, $R_1$ is a hydrocarbon group connected to the nitrogen atom through a member of the class consisting of a tertiary carbon atom and a secondary carbon atom of a cycloalkyl group and $R_2$ is selected from the class consisting of hydrogen, an alkyl group and an aryl group, and cellulose acetate dissolved in a common solvent.

5. A composition comprising a uniform mixture of polymerized N-tertiary butyl acrylamide and an acetone-soluble organic acid ester of cellulose.

6. A composition comprising a uniform mixture of polymerized N-tertiary butyl acrylamide and cellulose acetate.

7. A composition comprising about 80 parts by weight of cellulose acetate having an acetyl value of about 54.5%, calculated as acetic acid and about 20 parts by weight of N-tertiary butyl acrylamide dissolved in acetone.

8. A composition of matter which consists of 80% cellulose acetate and 20% of an acetone-soluble homopolymer of N-tertiary butyl acrylamide.

9. A spinning solution consisting essentially of about 80% acetone and 20% by weight of the acetone of a mixture consisting of 80% of cellulose acetate and 20% of an acetone-soluble homopolymer of N-tertiary butyl acrylamide.

10. A new composition of matter comprising cellulose acetate and an acetone-soluble copolymer of N-tertiary butyl acrylamide with a vinyl ester of a monobasic acid.

11. A spinning solution consisting essentially of acetone and a mixture consisting of 80% cellulose acetate and 20% of an acetone soluble homopolymer of N-tertiary butyl acrylamide.

12. A composition comprising a uniform mixture of polymerized N-tertiary butyl methacrylamide and an acetone-soluble organic acid ester of cellulose.

13. A composition comprising a uniform mixture of polymerized N-tertiary butyl methacrylamide and cellulose acetate.

References Cited in the file of this patent
UNITED STATES PATENTS

| | | |
|---|---|---|
| 2,215,196 | Schlack | Sept. 17, 1940 |
| 2,267,842 | Schlack | Dec. 30, 1941 |
| 2,311,548 | Jacobson | Feb. 16, 1943 |
| 2,402,942 | Bludworth | July 2, 1946 |
| 2,404,723 | Merner | July 23, 1946 |
| 2,790,789 | Miller | Apr. 30, 1957 |